United States Patent [19]
Robertson

[11] Patent Number: 5,013,076
[45] Date of Patent: May 7, 1991

[54] LOCKING PLATE HOLDER FOR RAILROAD BEARING END CAPS

[75] Inventor: Harry G. Robertson, Chicago, Ill.

[73] Assignee: Railhead Corporation, Chicago, Ill.

[21] Appl. No.: 457,969

[22] Filed: Dec. 27, 1989

[51] Int. Cl.⁵ .............................................. B60B 37/00
[52] U.S. Cl. .................................. 295/42.2; 295/36.1; 105/218.1
[58] Field of Search ............... 295/36.1, 42.1, 42.2, 295/42; 105/218.1; 411/93, 94, 95, 372

[56] References Cited

U.S. PATENT DOCUMENTS

| | | | |
|---|---|---|---|
| 782,822 | 2/1905 | Bryan et al. | 411/95 |
| 3,523,709 | 8/1970 | Heggy et al. | 295/42.2 |
| 3,727,969 | 4/1973 | Eddy et al. | 105/218.1 X |
| 3,741,603 | 6/1973 | McLean, Jr. | 295/42.2 |
| 4,015,874 | 4/1977 | Hennessy | 295/42.2 |
| 4,781,502 | 11/1988 | Kushnick | 411/93 X |

Primary Examiner—Russell D. Stormer

[57] ABSTRACT

A removable, reuseable holding jig for a locking plate associated with the end cap of a railroad truck bearing in which the locking plate provides a plurality of cap screw head apertures through which the end cap holding screws project when threaded into the axle end cap of the railroad bearing. The holding jig is of the same configuration of such locking plate but of a larger size so as to overlap the edges of such plate and to be confined in the well provided by the axle roller bearings. The holding jig will position, and by a series of lugs engage the sides of the locking plate so as to prevent rotational movement thereof resulting from the rotational torque of the cap screws as they are threaded into the axle bearing.

8 Claims, 4 Drawing Sheets

LOCKING PLATE HOLDER FOR RAILROAD BEARING END CAPS

FIELD OF INVENTION

This invention relates to a holding jig for use in conjuction with a locking plate that secures cap screws used to lock an axle end cap in position on a railroad bearing assembly. The holding jig is removable after the cap screws have been tightened and thus is reusable with other locking plates.

The ends of most railroad car axles provided with roller bearings provide three holes for receiving three cap screws or axle end cap bolts which secure an axle end cap to the railroad car axle. These cap screws must be secured with proper torque or tightness, since otherwise the roller bearings may not be properly aligned with the result that the bearing may be damaged or worse that it will malfunction and the rail car may be derailed.

In the past means were provided for preventing the three cap screws from becoming loose due to vibration or torque when the railroad car was in motion. The most acceptable means included a triangular plate having an opening at each corner for receiving the shanks of the cap screws. However, with the use of the triangular cap screw retaining plate there resulted a problem in obtaining the proper and equal torque on each cap screw. As the cap screws were threaded into the axle end cap the torque of the first cap screw to be tightened would cause the triangular plate to be displaced in the direction of the torque such that the edges of the remaining cap screw apertures would bear upon the shanks of the remaining cap screws and such frictional contact would result in the requirement of a greater torque to be applied on such remaining untightened screws. This created an uneven balance on the roller bearings resulting in their damage or destruction.

PRIOR ART

Past endeavors to prevent torque of the locking plate included re-constructing the locking plate with a rotation preventing member that was secured by a centrally located grease fitting. Such a structure is shown and described in U.S. Pat. No. 3,741,603, dated Jun. 26, 1973. Other patents which incidentally reflect attempts to prevent torque of the locking plate by redesigning the same include U.S. Pat. No. 3,523,709 and U.S. Pat. No. 4,015,874.

None of the prior art devices disclose a removable, reuseable locking plate holder which does not require the redesigning of the commonly used triangular shaped locking plate as does the present invention.

SCOPE OF THE INVENTION

The principal object of this invention is to provide a removable, reuseable holder for the industry accepted triangularly shaped locking plate used to lock an axle end cap in position on a railroad bearing assembly.

Another object of this invention is to provide a locking plate holder that is simple in use and economical in manufacturing. Other objects of this invention will appear hereinafter.

BRIEF DESCRIPTION OF THE DRAWINGS

The invention will be best understood by reference to the accompanying drawings which show the preferred form of construction and in which.

GENERAL DESCRIPTION OF THE INVENTION

The present invention is directed toward a structure that will maintain a locking cap placed on the end cover of a roller bearing structure in position during the threading of a set of cap screws under prescribed torque force.

Figure 6:
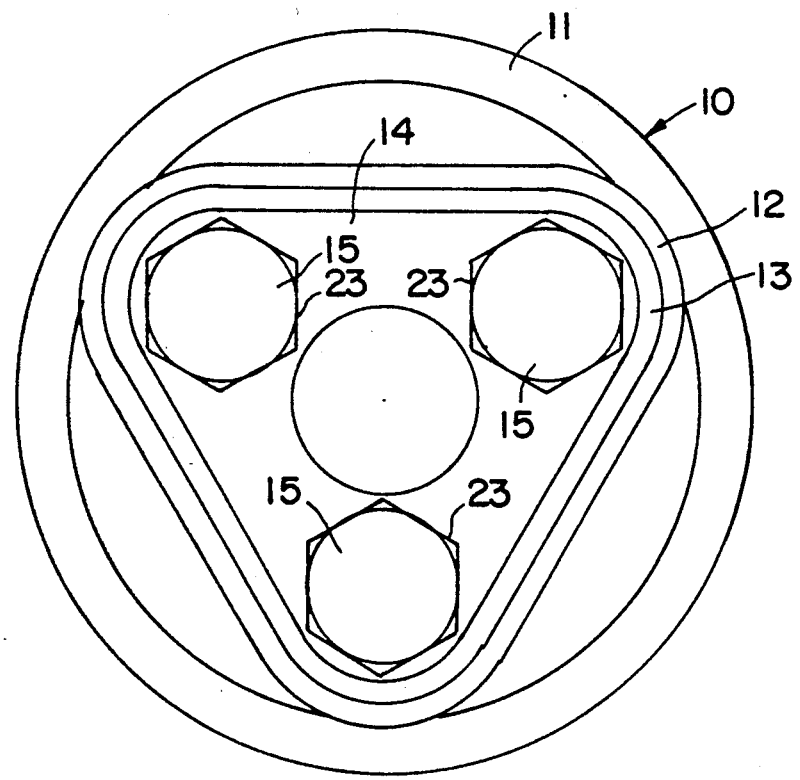
FIG. 6 is a plan view of a locking plate properly mounted on the axle end cap of a railroad bearing assembly.
Figure 7:
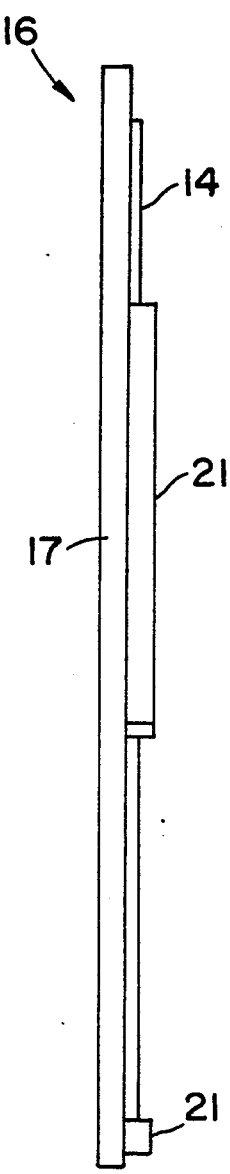
FIG. 7 is side elavational view of the holder mounted on a locking plate as shown in FIG. 3.

In the standard construction of a roller bearing for railroad trucks and the like, the roller bearing axle end 10 includes an end cover 11 that provides a substantially triangularly shaped rib 12 which in turn forms a receiving well 13, all as illustrated in FIG. 6. A locking cap 14 is positioned in the well 13 and is mounted on the end cover 11 and by a series of cap screws 15, securing the end of the roller bearing 10 into a integral unit.

Figure 1:
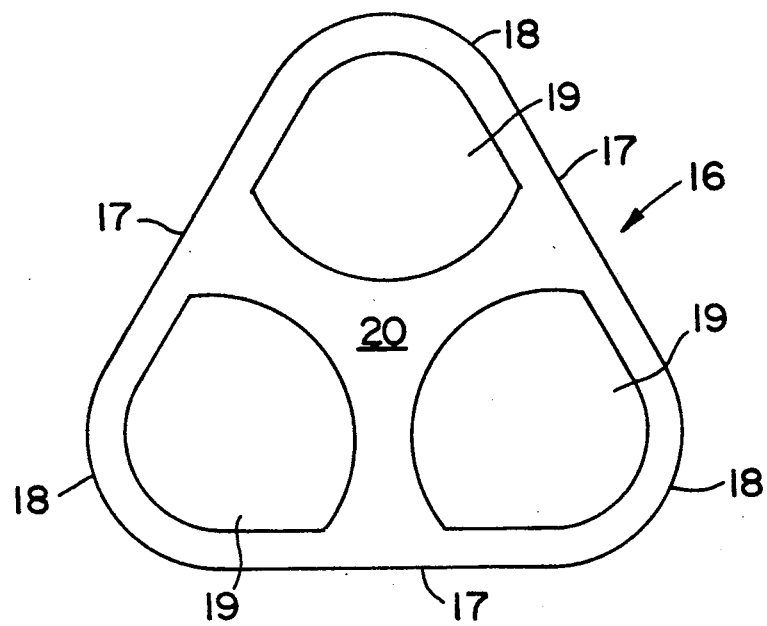
FIG. 1 is a plan view of the locking plate holder of this invention.
Figure 2:
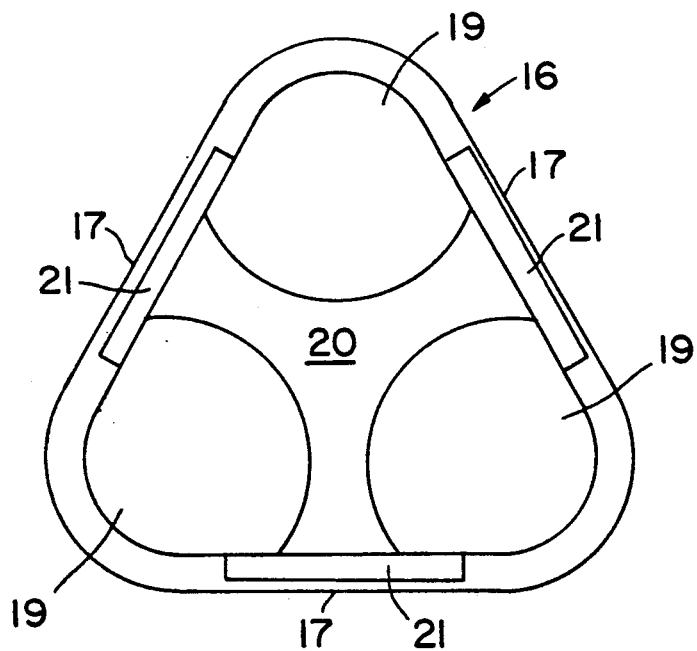
FIG. 2 is a plan view of the reverse side of the locking plate holder.

The present invention as illustrated in FIGS. 1 and 2 comprises a holding plate 16 substantially triangularly in shape so as to provide three equal side 17 connected by curved ends 18. Inwardly of the curved ends 18 are enlarged corner apertures 19 defined by a center web structure 20 connected to the three sides 17 as shown.

As illustrated in FIG. 2 the reverse side of the holding plate 16 illustrates a series of retaining bars 21 positioned beneath each of the three sides 17 intermediate the curved ends 18.

In application the holding plate 16 is snapped upon the locking cap 14 with the retaining bars 21 engaging the respective sides of the locking cap 14. As shown in FIG. 6, the holding plate 16 is of a size to fit into the well 13 in such a manner such that its sides 17 and ends 18 contact the triangular rib 12 which define the receiving well 13. Thus when the holding plate 16 is fitted upon the locking cap 14 the two pieces, as a singular unit, can be placed within the well 13 with the locking cap 14 in proper alignment for mounting upon the roller bearing end 10.

In actual practice the threaded shanks of the cap screws 15 are projected trough the screw receiving apertures 22 formed in the locking cap 14 with their hexagonal shaped heads 23 freely received in the apertures 19 formed in the holding plate 16. Each cap screw 15 is then tightened to the proper tightness which, for example, may require 250 foot pounds torque for a one inch cap screw. This torque is determined by a special wrench which measures the torque force being applied to a cap screw. In this process a workman applies the first cap screw to the proper tightness and then applies the remaining screws successively to the same tightness.

During this process the locking cap 14 has a tendency to shift in the direction of the torque applied to the first screw thus affecting a binding restricting contact with the shanks of the remaining screws. With this contact a distorted degree of torque needed to overcome such contact will have to be applied to the remaining screws which will in turn result in a slight bending of the end cap 11 and locking cap 14. This deformation effects the alignment of the roller bearings and results in wear and eventually malfunctioning of the same. However, when the holding plate 16 of the present invention is placed over the locking cap 14 in the manner heretofore described it will prevent the shifting or rotation of the locking cap 14 under the torque forces applied to the cap screws 15. when the locking cap 14 has been properly secured to the roller bearing end 10 the holding plate 16 may be removed and reused.

Figure 3:
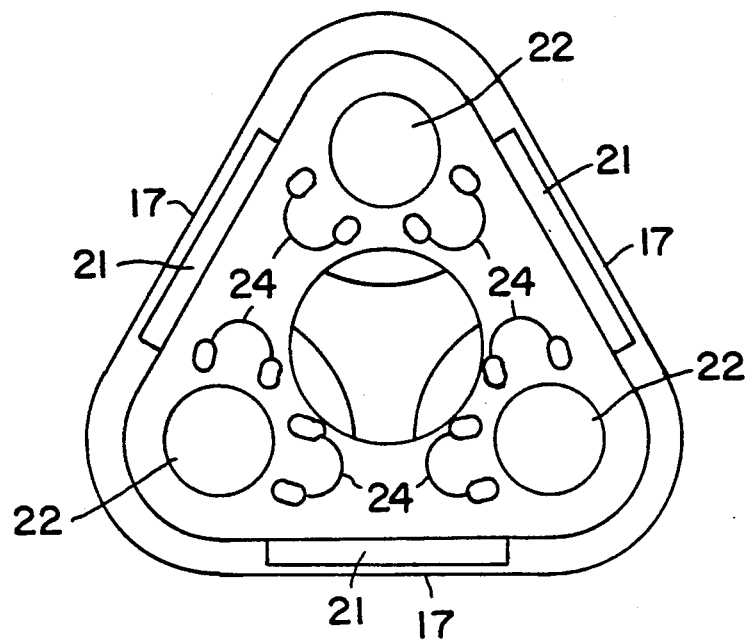
FIG. 3 is a plan view of the holder mounted on a locking plate.
Figure 4:
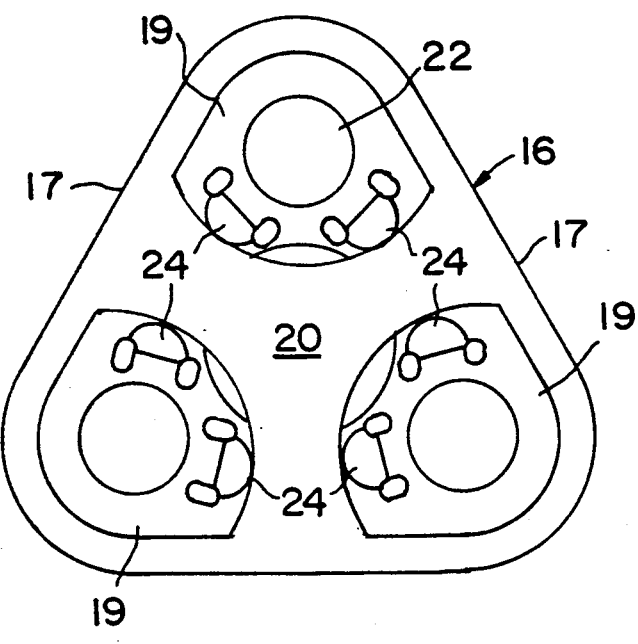
FIG. 4 is a plan view of a modified form of a holder mounted on the locking plate.

The locking cap 14, as illustrated in FIGS. 3 and 4, is provided with a series of lugs 24 struck from the holding cap 14 tangently about the circumference of the cap screw receiving apertures 22. After the cap screws 15 have been properly torqued these lugs may be bent to engage the hexagonal heads 23 of the cap screws 15 to prevent loosening through vibrational forces.

Figure 5:
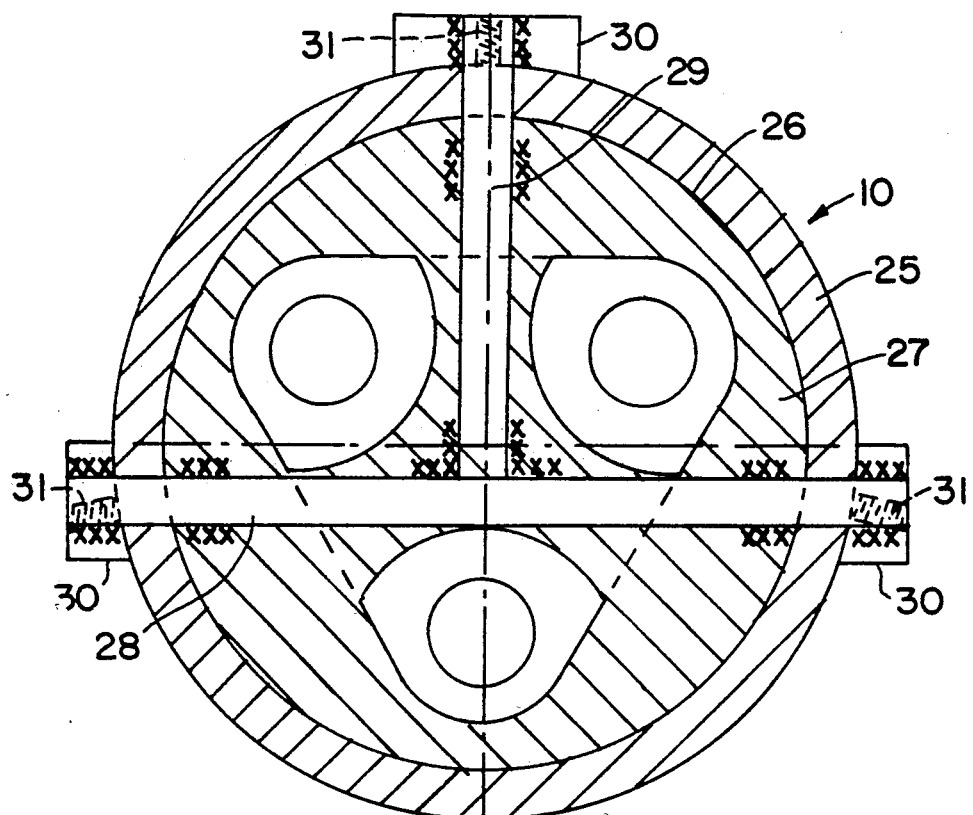
FIG. 5 is a plan view of modified locking plate holder.

In the majority of railroad bearings the ends are formed to provide the triangular shaped well 13 as heretofore described. However, certain bearing structures provide a circular wall 25 defining the locking cap receiving well 26 such as is illustrated in FIG. 5. To accomodate this structure there is provided a circular holding plate 27 adapted to fit into the well 26. To the exposed side of the plate 27 there is mounted a cross arm 28 and a radial legs 29, with the cross arm 28 and leg 29 being of a length to overlie the circular wall 25. The respective free ends of the arm 28 and leg 29 provide clips 30, the inner walls of which are arcuated to mach the curvature of the wall 25. Thus when the holding plate 27 is placed upon the locking cap 14, the plate 27 will fill the well 26 and the clips 30 carried at the free ends of the cross arm 28 and leg 29 will engage the outer edge of the well defining wall 25.

As illustrated in FIG. 5 each of the clips 30 is provided with tapped bores 31 which are adapted to receive set screws, not shown, that function to secure the holding plate 27 in a set position upon the locking cap 14 while the cap screws are torqued as hereinbefore described.

A modified form of the holding plate 16 is designed to be utilized with the lugs 24 provided by the locking cap 14 illustrated in FIG. 4. In such modification the apertures 19 formed in the holding plate 16 are of a reduced size so that their inner most curved ends engage the lugs 24 struck from the locking cap 14. By this arrangement the holding plate 16 is secured within the well 13 and prevents the rotation of the locking cap 14 under the conditions hereinbefore described.

From the foregoing I have described a reusable holding plate for positioning a locking cap of a railroad bearing structure in place during its attachment to the end bearing structure. The holding plate is removable after the cap screws have been properly tightened, and then is reuseable on other holding plates. The holding plate is simple in use, economical to manufacture, and higly efficient in performing its designated function.

While I have illustrated and described the preferred form of construction for carrying my invention into effect, it is capable of variation and modification without departing from the spirit of the invention.

Having thus described my invention what I claim as new and desire to protect by LETTERS PATENT is:

1. A removable holder for a locking plate of a railroad roller bearing assembly having an end cover providing a receiving well for the locking plate that is to be fastened therein by suitable cap screws torqued to a predetermined degree comprising;
   (a) a holder plate having a configuration corresponding to that of the receiving well of the bearing assembly and of a dimension equal to the inner dimension of the well so as to be secured therein against rotation created by the torque pressure applied to the cap screws, and
   (b) means provided by said holder plate for removably securing the same upon the locking plate as the the locking plate is secured in the receiving well against rotation in the direction of the torque applied to the cap screws fastening the plate to the bearing assembly.

2. A removable holder for a locking plate of a railroad bearing assembly as defined by claim 1 wherein said means provided by said holder plate for removably securing the locking plate thereto comprises a series of ribs adapted to releasably engage respective side edges of the locking plate.

3. A removable holder for a locking plate of a railroad bearing assembly as defined by claim 1 wherein the receiving well, locking plate and said holder plate are substantially triangular in shape with the locking plate being smaller in overall size than the receiving well and said holder plate, which are so dimensioned that said holder plate fills the receiving well in a secured position.

4. A removable holder for a locking plate of a railroad bearing assembly as defined by claim 3 wherein said means provided by said holder plate for removably securing the locking plate thereto comprises a series of ribs adapted to releasably engage respective side edges of the locking plate.

5. A removable holder for a locking plate of a railroad bearing assembly as defined by claim 1 wherein the receiving well and said holder plate of a circular configuration with the diameter of said holder plate being equal to the inner diameter of the receiving well, with said circular holding plate providing a preformed center opening of a size and configuration to receive and secure therein the locking plate as the same is fastened to the bearing assembly.

6. A removable holder for a locking plate of a railroad bearing assembly as defined by claim 5 including means for removably attaching said circular holding plate in the receiving well and for preventing rotation of said circular holding plate about a center axis.

7. A removable holder for a locking plate of a railroad bearing assembly as defined by claim 6 wherein said means for removably attaching said circular holding plate in the receiving well comprises a set of radially extending members of a length to overlie the circular receiving well, and means carried by the free ends of said radially extending members for tangentially contacting the outer peripheral wall of the circular receiving well so as to secure said holder plate in a fixed position therein.

8. A removable holder for a locking plate of a railroad bearing assembly as defined by claim 7 wherein said means carried by the free ends of said radially extending members comprise clips having inner and outer walls, with the inner walls arcuate so as to conform to the circumference of the circular receiving well, and including means for fastening said clips in a fixed position upon the wall of the receiving well.

* * * * *